United States Patent [19]

Bot et al.

[11] Patent Number: 6,086,937
[45] Date of Patent: Jul. 11, 2000

[54] SAUCE BASE COMPOSITION

[75] Inventors: David Simon Bot, Utrecht; Petrus Gerardus Haring, Vlaardingen; Arie Johannes Plancken, Hendrik Ido Ambacht, all of Netherlands

[73] Assignee: Lipton, division of Conopco, Inc., Englewood Cliffs, N.J.

[21] Appl. No.: 08/913,536

[22] PCT Filed: Mar. 28, 1996

[86] PCT No.: PCT/EP96/01392

§ 371 Date: Jan. 26, 1998

§ 102(e) Date: Jan. 26, 1998

[87] PCT Pub. No.: WO96/29894

PCT Pub. Date: Oct. 3, 1996

[30] Foreign Application Priority Data

Mar. 29, 1995 [EP] European Pat. Off. ............. 95200786

[51] Int. Cl.$^7$ ..................................... A23L 1/39
[52] U.S. Cl. .................. 426/589; 426/312; 426/319; 426/578; 426/601
[58] Field of Search ................... 426/589, 578, 426/312, 319, 601, 603, 604, 564

[56] References Cited

U.S. PATENT DOCUMENTS

| | | | |
|---|---|---|---|
| 4,038,424 | 7/1977 | Davies | 426/94 |
| 4,118,518 | 10/1978 | Perryman | 426/516 |
| 4,341,812 | 7/1982 | Ward | 426/603 |
| 4,390,561 | 6/1983 | Blair et al. | 426/607 |
| 4,396,638 | 8/1983 | Edo et al. | 426/564 |
| 4,486,457 | 12/1984 | Schijf et al. | 426/603 |
| 4,521,440 | 6/1985 | Lansbergen | 426/602 |
| 4,533,561 | 8/1985 | Ward | 426/603 |
| 4,536,411 | 8/1985 | Kirton et al. | 426/603 |
| 4,567,056 | 1/1986 | Schmidt | 426/607 |
| 4,578,278 | 3/1986 | Giddey et al. | 426/605 |
| 4,587,130 | 5/1986 | Stauber | 426/564 |
| 4,590,087 | 5/1986 | Pronk et al. | 426/603 |
| 4,591,507 | 5/1986 | Bodor et al. | 426/604 |
| 4,716,047 | 12/1987 | Biernoth et al. | 426/603 |
| 4,826,699 | 5/1989 | Soe | 426/564 |
| 4,869,919 | 9/1989 | Lowery | 426/604 |
| 4,917,915 | 4/1990 | Cain et al. | 426/573 |
| 4,933,192 | 6/1990 | Darling et al. | 426/98 |
| 4,990,355 | 2/1991 | Gupta et al. | 426/602 |
| 5,013,573 | 5/1991 | Bodor et al. | 426/402 |
| 5,061,506 | 10/1991 | Leach | 426/602 |
| 5,126,160 | 6/1992 | Giddey et al. | 426/564 |
| 5,178,897 | 1/1993 | Tanaka | 426/602 |
| 5,223,300 | 6/1993 | Brinkers | 426/603 |
| 5,336,514 | 8/1994 | Jones et al. | 426/564 |
| 5,370,896 | 12/1994 | Carter et al. | 426/589 |
| 5,393,549 | 2/1995 | Badertscher et al. | 426/564 |
| 5,536,523 | 7/1996 | Blauel et al. | 426/603 |
| 5,593,716 | 1/1997 | Appelqvist et al. | 426/589 |
| 5,869,125 | 2/1999 | Lynch et al. | 426/603 |

*Primary Examiner*—Carolyn Paden

[57] ABSTRACT

A composition, preferably fat continuous, of a scoopable or spoonable consistency for the preparation of sauces by addition of water and heating, comprising 5–80 parts by weight of fat, 0.5–15 parts by weight of water dispersible milk ingredients, 1–20 parts by weight of starch or a starch-like product, up to 40 parts by weight of water, taste and/or flavor compounds, and, optionally, 0.25–5 parts by weight of gelatin or similar hydrocolloid.

14 Claims, No Drawings

SAUCE BASE COMPOSITION

BACKGROUND OF THE INVENTION

The present invention relates to a fat continuous composition suitable for the preparation of sauces by adding water or an aqueous liquid and heating, which in addition to a vegetable fat comprises a flavour, and a protein.

High quality sauces comprising a fat or fat blend, a binder material and flavour improving ingredients like spices and red or white wine, and optionally a protein material such as milk and water dispersable milk ingredients have been prepared for a long time. Such sauces have been prepared fresh, i.e. by applying fresh ingredients, preparing a food or stock and a roux, and mixing these just prior or during cooking. However, the availability of food products which allow a minor effort for their preparation, and which are of a high quality which is at least comparable to freshly cooked food products are demanded these days. In addition to the desire for high quality with minor effort, todays consumer also has demands on the health aspect of the products to use.

Some consumer groups have the demand for low trans or trans free products, in particular in view of some publications that appeared in 1993 and 1994. These publications stated that trans unsaturated fatty acid residues had effects on blood cholesterol levels more resembling that of saturated fatty acid fats (SAFA) than was previously thought.

Suppliers of edible fat spreads responded rapidly to these new demands and reformulated existing products and introduced new ones thus providing products having reduced levels of trans unsaturated fatty acid residues or even being substantially free of such trans acid residues.

The debate on trans acids renewed the interest in the influence of fat composition on the blood lipids profile, one of the main risk indicators for cardiovascular diseases.

As high quality sauces are normally prepared from butter, these are considered not to fit the pattern of omitting non-healthy food.

Now, a high quality product is found having a good taste, the taste being comparable to that of a fresh home made sauce in which butter is used, and that can be prepared with very little effort.

BRIEF SUMMARY OF THE INVENTION

The present invention regards a sauce base composition comprising 5–80 parts by weight of a vegetable fat or fat blend, the total fat composition having a trans unsaturated fatty acid residue of less than about 4%, 0, 5–15 parts by weight of water dispersable dry milk ingredients, 1–20 parts by weight of a starch or a starch-like product such as modified starch and hydrolyzed starch, up to 40 parts by weight of water, taste and/or flavour compounds, and optionally, 0, 25–5 parts by weight of gelatin or a similar hydrocolloid.

DETAILED DESCRIPTION OF THE INVENTION

The fat blend can be a blend of vegetable fats, but can also be a melange comprising fish or animal fat, the latter preferably being butter. It is, however, for this invention necessary to assure that the fat composition has a total tufar level below 4%, and preferably is substantially free of tufar. Thus, in a preferred embodiement the fat or fat blend is substantially free of tufar. The fat blend is therefor substantially composed of vegetable fats. Substantially free of trans unsaturated fatty acid residues means less than 3%, preferably less than 1% trans unsaturated fatty acid residues. The fatty acid composition of a fat is measured by GLC analysis of FAME as described in e.g. EP 78568. The trans content of fat is measured as described in JAOCS 54, (1977), 208 as elaidic acid content. The amount of particular fatty acid residues of a fat are indicated with respect to the total amount of fatty acid residues of that fat.

Parts, percentages and proportions are expressed by weight unless indicated otherwise. The amounts indicated are amounts of the products as these are commercially available, thus any crystal water present in a compound being included. Amount ranges given in this application are percentages of a sauce base comprising about 20 wt % of water. Depending on the required type of product, more or less, or even no water at all can be present in the sauce base.

Liquid oil means edible glyceride oil that is free of solid fat at 20° C., preferably at 15° C. The solid fat content of fat is indicated by N-values and can be measured as described in Fette, Seifen, Anstrichmittel 80, 180–186, (1978). The stabilisation applied is heating to 80° C., keeping at a temperature of at least 60° C. for at least 10 minutes, keeping for 60 minutes at 0° C. and keeping for 30 minutes at the measuring temperature.

Throughout this specification, the terms "oil" and "fat" are used interchangeably.

Any type of fat or fat blend can be applied, as long as the total tufar content in the fat is less than 4%. Although some structuring fat is desirable for obtaining a suitable scoopability in the sauce base composition. Preferably a fat with a solids contents of about 8 at 15° C. is to be used. Examples of suitable vegetable fat are bean oil, hydrogenated palm oil, or interesterified fats can be applied, like the ones as used in margarine blends. The use of some butterfat is desirable for flavour reasons.

In one embodiment of the invention the water dispersible dry milk ingredients are composed of 0.5–10 parts by weight of skim milk powder and 0.5–5 parts by weight of whey protein, calculated on the same basis as the milk ingredients. It does not need explanation that instead of dry milk ingredients skim milk, concentrated skim milk, ultrafiltrated skim milk, whey protein concentrate or any other form of such materials may be used, provided the same amount calculated on dry matter is added.

The product of the present invention is a sauce base composition to which upon its use, water can or has to be added in an amount depending on the desired viscosity of the final sauce. After mixing a sauce base of low viscosity is obtained. By heating this product, and maintaining the heating for about 5–120 seconds after the products starts to boil, a creamy, warm sauce of exellent mouthfeel and texture is obtained.

Suitably, to the sauce base composition water is added in such an amount that the composition which is ready for heating to obtain a kitchen sauce comprises between 30 and 80 wt % of water and preferably 40–70 and even more preferred in the range of about 50 to about 65 wt %.

In the sauce base of the present invention, other ingredients can be present which improve the quality and similarity to a high quality home cooked sauce. For example, taste and flavour improving ingredients such as salt, spices, red or white whine, or taste components thereof such as sodium lactate, sodium succinate, citric acid, sodium or potassium tartrate, sodium acetate and the like can be present in suitable amounts. Furthermore, a stabilizer such as lecithin and/or monoglyceride in an amount between 0.05 and 2 wt %, in particular between 0.1 and 1 wt % is preferably present.

Hence, in a preferred embodiment, a sauce base composition has been found which can be used in the kitchen by the simple addition of water and heating and which provides excellent taste, texture, mouthfeel and the like. In one embodiment, the sauce base comprises 40–70 wt % of a fat or fat blend, 2–8 wt % skim milk powder, 1–3.5 wt % of a whey protein, 5–12 wt % of a starch or starch derivative which has not substantially gelled, 1–5 and preferably 2–4 wt % of gelatin, 0.2–1 wt % lecithin, 3–6 wt % of a salt comprising flavour compound such as a bouillon flavour, 3–8 wt % of a red or white wine or taste components thereof in equivalent amounts, and 10–25 wt % water.

In preparing a sauce by use of the presently found sauce base composition ingredients can be added as desired, such as onions, garlic, cheese, tomatoes, spices, and the like.

The sauce base composition can be prepared as a dry, powder product which is to be mixed with water, as a concentrate to which water has to be added, or as a base sauce to which no water needs to be added. Once water has been added, if needed, the composition is to be heated, and by swelling of the binders a sauce of the desired viscosity is obtained.

Advantageously, the sauce base composition comprises 10–35 wt %, preferably 15–30 wt % water. Such a sauce base composition can easily be prepared by the use of for fat comprising food products commonly applied technology, such as preparation by the use of margarine technology, e.g. use of votators, or by the use of a Hobart mixer.

The microbiological stability of the product was found to be rather high, also for the emulsion type products, which means that the product after partial use can be used up till at least 6 weeks thereafter if stored at chill temperatures.

The water comprising sauce base composition can be a water continuous or fat continuous product, depending on the amount of fat and method of preparation used. However, a fat continuous sauce base composition is highly preferred. Such a fat continuous sauce base shows an improved microbiological stability compared to the water continuous sauce base composition. Furthermore, a sauce prepared from a fat continuous sauce base composition has a very good mouthfeel and taste.

In the sauce base composition, 1–20 wt % of a starch is present which preferably has not considerably gelled. This means that the starch in the sauce base composition has not been heated to a temperature and for a time sufficient to gel. Some gelling might have taken please during the preparation of the sauce base, e.g. upon its pasteurization However, if the sauce base product of the invention is subjected to light microscopy analysis, starch particles are shown, which are known to be characteristic for a starch which has not gelled.

As starch material, unmodified, modified and hydrolysed starch and mixtures thereof can be applied. The use of unmodified and/or modified starch is preferred. Examples of suitable starches are maize starch, Thermflow ex National Starch, or Snowflake ex Cerestar. Preferably, starch is present in an amount between 1 and 15 wt %, more preferably between 4 and 10 wt %, without the presence of gelatine. In case gelatine is present higher amounts of starch are to be used for achieving the same consistency.

In addition to starch, one or more hydrocolloid binding materials can be present. Suitable examples are guar gum, carrageenan, agar, xanthan, pectin, LBG, CMC and the like. Depending on the presence and amount thereof of any such binders, other amounts of starch than indicated above can be preferred.

Fat can be applied in an amount between about 5 and 80 wt %. A fat continuous product being preferred, fat being applied in an amount between 10 and 80 wt % is desired. For reasons of mouthfeel, texture, taste and consumers desire for reduced calorie food products, a fat range between 20 and 70 wt % is desired, whereas for obtaining a product comparable to home prepared fresh sauces, a product comprising between 40 and 60 wt % fat is particularly desired.

It was found, however, that very good sauces can be prepared as well from a sauce base high in fat, (i.e. up to 80% or even little above) and very low or even without water. To this type of sauce base, the addition of some gas to the composition was in particular found to be very advantageous, as the benefits, in particular improved structure and scoopability were observed to be largest compared to compositions of lower fat and higher water content.

For reasons of taste and mouthfeel consistency, and appearance of the sauce 0.25–5 wt % of gelatin is present. Preferably, modified or unmodified starch and gelatin are present in a weight ratio of about 2:1 to 6:1 and preferably 3:1 to 4:1 starch:gelatin.

As a whey protein such as Lacprodan 80 ex Danmark protein can be applied. Preferably, the sauce base comprises 0.5–5 wt % of a whey protein, more preferred 1–4 wt % and particlularly 2–3 wt %.

Skim milk, either as a powder or as a fluid is preferably present in an amount of 0.5–10 wt %, calculated as dry powder, more preferred 1–8 wt % and particularly 3–6 wt %.

Optionally, the fat phase comprises some monoglyceride to improve the stability of the emulsion.

For the preparation of the sauce base of the present invention, it is preferred that a water phase (or, if no water is used, the "second" phase) and a fat phase are prepared separately. In one suitable manner for preparation, to the water phase, advantageously the dry components except for fat (and, if applicable, monoglyceride and/or lecithin) are added to a heated mixture of water and, optionally, wine of a temperature of about 70–100° C., the starch is added in the end. The fat phase ingredients are heated to a temperature of about 40–80° C. In this preferred method of preparation, these phases are mixed by use of a Turrax mixer, and the mixture is added to a votator or to a so called Hobart mixer.

In still another method for the preparation of the sauce base, the fat phase, starch (component) and whey protein are mixed, and in the water phase or second phase, the other components are mixed, after which the two phases are mixed and, preferably, added to a votator and, optionally, a crystallizer unit.

If a dry powder sauce base is prepared, the ingredients can be admixed, homogenized and subsequently spray dried.

To prepare a water containing sauce base composition, advantageously use is made of one or more votators, and, optionally, crystallizers. Another advantageous method for preparation is the admixing and homogenizing in a Hobart mixer. These techniques are relatively simple and well known methods for the preparation of viscous, fat containing food products such as margarines.

By the addition of a gas such as air, carbon dioxide or preferably nitrogen, by methods well known in the art, the structure of the water containing sauce base can be altered. Without addition, a 15–25 wt % water containing product has a fairly stiff pate-like morphology, whereas the addition of a gas provides a soft, spoonable, mousse-like structure. If a gas is added, it is highly preferred that some hard fat is present in the fat composition applied in the sauce base composition.

The invention is further illustrated with the following examples.

EXAMPLE I

A kitchen sauce base was prepared as follows:

52.8% of a fat blend of 80% bean oil, 10% hydrogenated palm oil with a slip melting point of 44° C., and 10% of an hydrogenated interesterified mixture of palm oil and palm kernel oil with a slip melting point of 45° C. was heated to a temperature of 60° C., and 0.33% lecithin (bolec ztd) was added to form a fat phase.

A water phase was prepared by heating a mixture of 18.64% water and 5.5% red wine to 85–90° C., and addition of 4.4% skim milk powder, 2.0% Lacprodan 80, 3.3% gelatin 100 Bloom ex Sanofi, 4.4% bouillon flavour. 0.13% potassium sorbate, 0.79% Na lactate, 0.15% Na2 succinate, 0.03% citric acid, 0.91% K Na tartate, 0.02% Na acetate, and, after these ingredients have been added, addition of 6.6% Snowflake 6301 ex National Starch.

The water phase was dispersed in the fat phase by use of a Turrax mixer, and the dispersion obtained was kept at 50° C.

The mixture was added to a votator (A-unit) (800 rpm, temperature at outlet 10–12° C.), a second A-unit (600 rpm, temperature at outlet 7–8° C.), and a crystallizer (C-unit) (150 rpm, t at outlet 5–7° C.), at a throughput of 4 kg/h resulting in product IA.

Product IB was obtained after having passed both A units, no C unit was applied.

The products obtained were fairly similar and spoonable. Product IA however had little structure whereas product IB had more body.

To these products, an equal amount of water was added, the ingredients mixed during heating, and the heat source was extinguished after the mixture boiled for 30 seconds. Viscosity, taste and texture were very much comparable to a home made kitchen sauce prepared with concentrated fond or stock, wine, dairy cream and starch.

EXAMPLE II

A sauce base was prepared as follows:

52.8% of a fat blend of 80% bean oil, 10% hydrogenated palm oil with a slip melting point of 44° C., and 10% of an hydrogenated interesterified mixture of palm oil and palm kernel oil with a slip melting point of 45° C. was heated to a temperature of 60° C., and 0.33% lecithin (bolec ztd) was added to form a fat phase.

A water phase was prepared by heating a mixture of 18.64% water, 5.5% red wine and 0.79% Na lactate to a temperature of 85–90° C., and addition of 4.4% skim milk powder, 2.0% Lacprodan 80, 2.6% gelatin 100 Bloom ex Sanofi, 4.4% bouillon flavour, 0.13% potassium sorbate, 0.15% Na2 succinate, 0.03% citric acid, 0.91% K/Na tartrate, 0.02% Na acetate, and, after these ingredients have been added, addition of 7.3% Snowflake 6301 ex National Starch.

The water phase was dispersed in the fat phase by use of a Turrax mixer, and the dispersion obtained was kept at 50° C. The mixture was passed through a votator (A-unit) (400 rpm, temperature at outlet 10–12° C.), a second A-unit (800 rpm, temperature at outlet 7–8° C.), and a crystallizer (C-unit) (125 rpm, with a temperature at outlet of 5–7° C.), the line being operated at a throughput of 4 kg/h. The product obtained (product IIA) was fairly rigid but scoopable.

To the above obtained scoopable product, an equal amount of water was added, the ingredients were mixed during heating, and the heat source was extinguished after the mixture boiled for 30 seconds. Viscosity, taste and texture were very much comparable to a home made kitchen sauce.

EXAMPLE IIB

The mixture obtained from the Turrax mixer was passed through a votator (A-unit) (400 rpm, temperature at outlet 22–24° C.), a second A-unit (600 rpm, temperature at outlet 17–19° C.), and a crystallizer (C-unit) (125 rpm, t at outlet 14–15° C.) at a throughput of 8 kg/h.

The product obtained was similar to that of Example IIA.

To this product, an equal amount of water was added, the ingredients mixed during heating, and the heat source was extinguished after the mixture boiled for 30 seconds. Viscosity, taste and texture were very much comparable to a home made kitchen sauce.

EXAMPLE IIC

The same process as IIA was repeated although $N_2$ was injected before the crystallizer at a rate sufficient to obtain an overrun of 50% (i.e. 25 vol % $N_2$). This resulted in an improved scoopability, and further easyness with respect to the mixing of the product with water to obtain the kitchen sauce.

EXAMPLE III

A kitchen sauce base was prepared as follows, the percentages indicated are weight percentages based on the total weight of the end product (sauce base) obtained after mixture of the fat and water phase unless indicated otherwise:

Preparation of the fat phase:

59.6% of a fat blend of 60% bean oil, 21% sunflower oil, and 19% of an hydrogenated interesterified mixture of palm oil and palm kernel oil with a slip melting point of 44° C. was heated to a temperature of 60° C. Thereto, 0.33% lecithin (bolec ztd), 7.3% of modified starch ex National Starch, 2% whey protein, and 0.0024% of B-caroteen(10%) were added to form a fat phase.

A water phase was prepared using 18.94% water, 3.5% of a savoury flavour, 4.4% skim milk powder, 2.6% gelatin (250 Bloom, ex Sanofi), 0.13% potassium sorbate, 0.91% K Na tartrate, and 0.02% of caramel powder and some minor amount of Na acetate, citric acid and Na-succinate were mixed until a homogeneous aqueous mixture (pH 4.7) was obtained.

The water phase was dispersed in the fat phase by use of a Turrax mixer, and the dispersion obtained was kept at 60° C. The so obtained mixture was added to a votator (A-unit) (1000 rpm, temperature setpoint 22° C.), a second A-unit (1000 rpm, temperature setpoint 20° C.), and a crystallizer (C-unit) (75 rpm), at a throughput of 60 kg/h. This product was then added to an A-unit to which 10% nitrogen (based on the total weight of the composition) was dosed (A unit operated at 1000 rpm, temperature setpoint 16° C.), and subsequently to a C-unit operated at 100 rpm.

A margarine like sauce base which was very well scoopable was obtained, which upon addition of about 130 cl water per 100 gr of sauce base, heating and stirring in a sauce pan resulted in an excellent, well tasting sauce of good texture, very much comparable to a home made kitchen sauce prepared with concentrated fond or stock, dairy cream and starch.

EXAMPLE IV

A kitchen sauce base was prepared as follows, the percentages indicated are weight percentages based on the total weight of the end product (sauce base) obtained after mixture of the fat and water phase unless indicated otherwise:

Preparation of the fat phase:

78.5% of a fat blend of 60% bean oil, 21% sunflower oil, and 19% of an hydrogenated interesterified mixture of palm oil and palm kernel oil with a slip melting point of 44° C. was heated to a temperature of 60° C. Thereto, 0.42% lecithin, 9.2% of modified starch, 2.5% whey protein, and 0.003% of 10% B-caroteen were added to form a fat phase. A second phase was prepared using 3.779% of a savoury flavour compound, 5.54% skim milk powder, and 0.025% of caramel powder were mixed until a homogeneous aqueous mixture was obtained.

The phases were mixed by use of a Turrax mixer, and the mixture obtained was kept at 60° C.

This product was then processed as described for the mixture obtained in Example III.

A good sauce base was formed which was easy scoopable, even though no water was added! To this mixture, about 200 cl of water were added per 100 gr sauce base. Upon heating, boiling for about 30 seconds and stirring, a pleasant, well tasting sauce of good structure and texture was obtained.

What is claimed is:

1. A fat continuous composition suitable for the preparation of sauces, which in addition to fat comprises a flavour and a protein, characterised in that the composition is a sauce base comprising 5–80 parts by weight of a vegetable fat or fat blend, the total fat composition having a trans unsaturated fatty acids residue level of less than 4%, 0.5–15 parts by weight of water dispersible dry milk ingredients, 1–20 parts by weight of a starch or starch-like product selected from the group consisting of, a starch derivative, modified starch and hydrolyzed starch, up to 40 parts by weight of water, and taste and/or flavour compounds, said sauce base having been treated with a gas selected from the group consisting of air, carbon dioxide and nitrogen.

2. Fat continuous composition according to claim 1, characterised in that the fat composition is substantially free of trans unsaturated fatty acids.

3. Fat continuous composition according to claim 1, characterised in that it comprises a stabilizer such as lecithin in an amount between 0.05 and 2 wt %.

4. A composition in accordance with claim 3, wherein said lecithin is present in an amount between 0.1 and 1 wt. %.

5. Fat continuous composition according to claim 1, characterised in that it comprises 40–70 wt % of a fat or fat blend, 2–8 wt % skim milk powder, 1–3.5 wt % of a whey protein, 5–12 wt % of a starch which has not substantially gelled, 2–4 wt % of gelatin, 0.2–1 wt % lecithin, 3–6 wt % of a salt comprising flavour compound, 3–8 wt % of red or white wine or equivalent amounts of taste components thereof, and 15–25 wt % water.

6. Fat continuous composition according to claim 1, characterised in that the composition contains modified starch.

7. Fat continuous composition according to claim 6, characterised in that 0.25–5 wt % of gelatin is present.

8. Fat continuous composition according to claim 7, characterised in that modified or unmodified starch and gelatin are present in a weight ratio of 2:1 to 6:1.

9. A composition according to claim 8, wherein said modified or unmodified starch and gelatin are present in a weight ratio of 3:1 to 4:1 starch:gelatin.

10. Fat continuous composition according to claim 1, characterised in that starch is present in an amount between 1 and 15 wt %.

11. A composition according to claim 10, wherein said starch is present in an amount between 4 and 10 wt. %.

12. Fat continuous composition according to claim 1, characterised in that fat is present in an amount between 40 and 60%.

13. Sauce characterized in that it is prepared by adding water or an aqueous liquid to the composition according to claim 1 and heating the so obtained mixture.

14. A composition according to claim 1, which further comprises 0.25–5 parts by weight of gelatin or a similar hydrocolloid.

* * * * *